US006035990A

United States Patent [19]
Peschke

[11] Patent Number: 6,035,990
[45] Date of Patent: Mar. 14, 2000

[54] SEAL FOR A RING PISTON OF A HYDRAULIC CLUTCH DISCONNECTING DEVICE

[75] Inventor: Harald Peschke, Veitsbronn, Germany

[73] Assignee: Luk Lamellen und Kupplungsbau, Bühl, Germany

[21] Appl. No.: 09/142,330

[22] PCT Filed: Nov. 26, 1996

[86] PCT No.: PCT/EP96/05221

§ 371 Date: Sep. 4, 1998

§ 102(e) Date: Sep. 4, 1998

[87] PCT Pub. No.: WO97/33108

PCT Pub. Date: Sep. 12, 1997

[30] Foreign Application Priority Data

Mar. 4, 1996 [DE] Germany .......................... 196 14 385

[51] Int. Cl.[7] .................................................. F16D 25/08
[52] U.S. Cl. .................................. 192/85 CA; 192/91 A; 277/560; 277/566
[58] Field of Search ............................ 192/85 CA, 91 A; 277/560, 566

[56] References Cited

U.S. PATENT DOCUMENTS

| | | | |
|---|---|---|---|
| 1,336,564 | 4/1920 | Jennings . | |
| 4,585,106 | 4/1986 | Shirley ............................... | 192/85 CA |
| 4,821,627 | 4/1989 | Leigh-Monstevens ............. | 192/85 CA |
| 5,287,951 | 2/1994 | Voit et al. ........................... | 192/85 CA |
| 5,307,915 | 5/1994 | Grosspietsch et al. ............. | 192/95 CA |
| 5,458,224 | 10/1995 | Takano ................................ | 192/85 CA |

FOREIGN PATENT DOCUMENTS

| | | |
|---|---|---|
| GM 18 63 841 | 7/1962 | Germany . |
| GM 79 00 776 | 7/1979 | Germany . |
| 30 14 797 A1 | 10/1980 | Germany . |
| 81 28 121 U1 | 12/1981 | Germany . |
| 32 45 338 A1 | 6/1984 | Germany . |
| 88 01 765 U | 5/1988 | Germany . |
| 41 13 925 A1 | 11/1992 | Germany . |
| 43 24 437 A1 | 1/1995 | Germany . |
| 43 33 244 A1 | 5/1995 | Germany . |
| 44 39 242 A1 | 5/1995 | Germany . |
| 44 12 928 A1 | 10/1995 | Germany . |
| 2 259 346 | 3/1993 | United Kingdom . |

OTHER PUBLICATIONS

German Search Report dated Sep. 16, 1996 for Application No. 196 14 385.3.
Simrit–Werk brochure, pp. 10 and 11, dated Jun., 1972.
Martin Merke GmbH product information brochure, dated May, 1982.
International Search Report dated Feb. 21, 1997 for International Application No. PCT/EP96/05221.

*Primary Examiner*—Rodney H. Bonck
*Attorney, Agent, or Firm*—Akin, Gump, Strauss, Hauer & Feld, L.L.P.

[57] ABSTRACT

The invention concerns a disconnecting device for a motor vehicle friction clutch which contains a pressure housing (2) arranged concentrically to a gear box input shaft (3) and fastened to a gear box housing (4). A guiding sleeve (6) is arranged in the pressure housing (2) radially separated from the gear box input shaft (3) and from a longitudinal bore (5) in the pressure housing (2) on which a ring piston (7) is movably guided which axially delimits a pressure chamber (8). For sealing the ring piston (7), a seal (12) is provided which has sealing lips (13, 14) spread apart in a V-shape.

In accordance with the invention, the sealing lips (13, 14) of the seal (12) have an asymmetrically configured cross sectional profile.

18 Claims, 3 Drawing Sheets

6,035,990

SEAL FOR A RING PISTON OF A HYDRAULIC CLUTCH DISCONNECTING DEVICE

BACKGROUND OF THE INVENTION

The invention concerns a disconnecting device for a friction clutch of motor vehicles, including a slave cylinder which can be acted upon by means of a hydraulic fluid, and which contains a pressure housing attached to the front of a gear box housing and arranged concentrically around a drive shaft, whereby a guiding sleeve is arranged at a distance radially toward the drive shaft in a longitudinal bore in the pressure housing in which a ring piston is movably guided and which delimits a pressure chamber axially, whereby for sealing, the ring piston has a piston seal which is provided with sealing lips spread apart in the shape of a V.

Disconnecting devices generally of this type for use in connection with manual transmissions are known from numerous publications, for example U.S. Pat. No. 1,336, 564. For sealing the pressure chamber, this publication discloses a ring piston seal with a symmetrical construction in connection with which the radially inner sealing lip as well as the radially outer sealing lip lie sealing on the guiding sleeve and bore wall of the pressure housing spread apart from each other in a V shape. Based on the differences in diameter between the sealing lips, sealing surfaces which deviate from each other result such that a contact force of the sealing lips similarly differs. From this it follows that with an axial movement of the ring piston on the radially outer sealing lip, greater forces of friction arise in comparison to the radially inner sealing lip. As a consequence of this, no consistent wear and tear pattern is established between the inner and outer sealing lip. The different stress upon the sealing lips in relation to each other can moreover lead to a disadvantageous extrusion of the outer sealing lip, or to a twisting of the seal, which brings about an impairment of function.

A radial seal with a U-shaped cross sectional profile is known from DE-U 88 01 765. The construction of this sealing ring provides a so-called connecting leg which is configured as a circular ring-shaped disk. Legs of identical length oriented in an axial direction are formed on the connecting leg on the inner and outer contour. The inner sealing leg moreover possess a lesser wall strength in comparison with the outer clamping leg. A sealing lip is assigned to both legs in the end region. Due to the large axial construction length and the great instability associated with this (especially of the inner sealing leg), this radial sealing ring is not suited for installation in a disconnecting device.

SUMMARY OF THE INVENTION

For this reason, underlying the invention is the object of creating a seal for a hydraulic disconnecting device which has identical stress in both sealing lip cross sections, the functional safety and efficiency of which is improved, as well as being able to prevent an extrusion without affecting manufacturing costs and assembly.

The above-noted object is accomplished in accordance with the invention with a hydraulic disconnecting device for a friction clutch which includes a slave cylinder which can be acted upon by means of hydraulic fluid and which contains a pressure housing arranged concentrically to a gear box input shaft attached on a gear box housing. A guiding sleeve is arranged on the pressure housing radially at a distance to the gear box input shaft and to a longitudinal bore in the pressure housing upon which a ring piston is axially guided and movable, and axially delimits a pressure chamber. For sealing the pressure chamber, the ring piston has a seal on the pressure chamber side which is provided with V-shaped, spread apart sealing lips. The inventions relate to seals the cross section profile of which provides sealing lips arranged asymmetrically in relation to each other, as well as sealing lips which have a different length from each other. Common to both inventions is the dynamic sealing effect of the sealing lips which form a sliding sealing surface with the associated contact surface of the longitudinal bore in the pressure housing or the guiding sleeve. The dynamic sealing action of both sealing lips improves the sealing quality of the seal and therewith functional safety and efficiency.

Moreover, with the arrangement of the seals of the invention, a dimensioning of the sealing lips is provided for achieving equal stress and therewith wear and tear values. The identical symmetrical friction force of the invention moreover effectively prevents a disadvantageous twisting or extrusion which has an advantageous action on the fatigue limit or lifetime of the seal. The seal construction of the invention in addition represents a clear improvement in efficiency without at the same time disadvantageously influencing manufacturing costs of the seal and assembly.

Advantageously, the concept of the invention makes possible a nearly equal stress, that is identical axial stresses and/or strains in the radially spaced apart sealing lips of the ring piston seal. At the same time, the invention includes constructing a seal with asymmetrically arranged sealing lips in connection with various sealing lip lengths, or a seal in connection with which one of these measures is provided alone.

In one configuration of the invention, the radially outer sealing lip has a greater wall thickness in comparison with the radially inner sealing lip. In addition, the axial length of the inner sealing lip exceeds the length of the outer sealing lip. In accordance with the difference in the pressurized sealing surfaces, a matching of forces of friction is possible through a difference in length of the sealing lips adapted to it. As an alternative or in conjunction with it, the invention provides a different sealing lip length as well as a greater wall thickness of the radially outer sealing lip.

The seal construction of the invention moreover includes a construction of the V-shaped recess between the sealing lips which is radially sealing offset from the middle of the pressure chamber. With this measure, an almost constant wall thickness or a slightly conical wall course of the respective sealing lip is attainable, that is, from the free end of the sealing lips to the uniting of these on the back of the seal. An optimal wall thickness ratio can be determined by experiments in connection with which the wall thickness of the radially outer sealing lip has a 10% greater value.

As a measure for the axial projecting length, that is a length difference "X" of the radially inner sealing lip from the radially outer length, a measure of $\leq 4$ mm has proven suitable in practice.

For selective influencing of the pressure gradient "dp/dl," that is, the contract pressure "p" over the relative length "l" of the seal between the fluid side of the sealing lips and the side facing away from this, the sealing lips of the invention are configured as follows. In a transition zone between a cylindrical segment at the free end of the sealing lips and a segment pointing obliquely in the direction of the back of the seal, a radius is provided in the area of a seal edge. This radius forms a tangent point on the segment which is set apart from or agrees with a further point of tangency shifted radially toward the inside which is provided in a transition zone of the sealing lip to the back of the seal. Owing to this sealing ring configuration, a contact pressure "p" of the sealing lip arises over the relative length "l" which, regarded from the fluid side, as forms a desired steep pressure gradient, that is a continuously increasing pressure profile until it reaches the seal edge. A flat pressure gradient follows from the pressure edge, that is a continuously falling pressure profile. The sharply deviating courses of the pressure gradients from each other has a positive influence on the sealing action and the wear and tear behavior of the sealing lips as well as on the overall efficiency of the sealing. The continuously dropping pressure profile on the side of the sealing lips facing away from the fluid side favors friction by maintaining a constant oil-filled clearance which acts as a lubricant film. Increased friction, which increases sealing lip wear and tear, is therewith advantageously avoided. As an axial measure for the cylindrically configured free end of the sealing lips, a value of $\leq 2$ mm from the free end to the seal edge has proven to be appropriate.

The sealing profile of the invention provides the following geometrical proportion of dimensions of the seal in relation to the longer, that is radially enclosed sealing lip. A value from 0.5 to 1 has proven advantageous as a proportion of dimensions of the sealing breadth to the compartment, that is, the outside diameter of the sealing lips in the installed state. In contrast, a value of 0.4 to 0.8 was determined as a relationship for the width of the back of the seal to the sealing breadth. For fixing the external contour of the seal of the invention, a radial proportion of dimensions is furthermore provided which indicates the radial offset of the sealing lips to the jacket surface of the seal in the area of the back of the seal. A value of $\geq 0.5$ has been established for the radial proportion b/a. The dimension "b" indicates the distance between the back of the seal to the tangential point "$T_2$," which is formed between the radius "$R_2$" and the segment "t." The dimension "a" corresponds to the radial distance from the back of the seal up to the seal edge. Depending upon the geometrical proportions of the seal, and establishing that the radius "$R_2$" is clearly larger than the radius "$R_1$," a value of $\geq 0$ can occur for the segment "t."

BRIEF DESCRIPTION OF THE DRAWINGS

An embodiment of the invention is represented based upon the following seven figures, wherein.

DETAILED DESCRIPTION OF THE DRAWINGS

Figure 1:
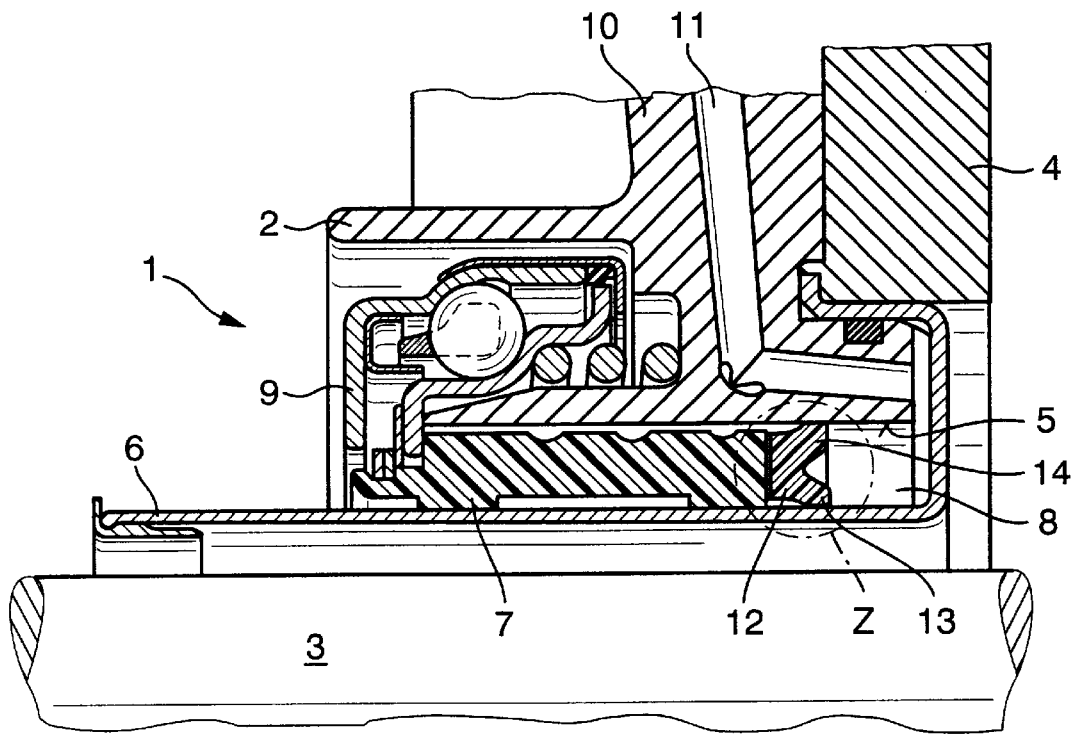
FIG. 1 shows in a half section a hydraulic disconnecting device of the invention for a friction clutch of motor vehicles.

A hydraulic disconnecting device with reference number 1 is represented in half section in FIG. 1. The disconnecting device 1 is separably fastened to a gear box housing 4 by means of a pressure housing 2 arranged concentrically to a gear box input shaft 3. A ring piston 7 is axially guided and movable on a guiding sleeve 6, which is arranged radially apart from the gear box input shaft 3 as well as from a longitudinal bore 5 of the pressure housing 2. On the end side of the side facing away from the gear box housing 4, the ring piston 7 is provided with a release bearing 9 which is force-locked on a friction clutch of the vehicle in the installed state. On the gear box housing side, the ring piston 7 delimits a pressure chamber 8 which can be acted upon by a pressurized fluid which can flow through a feed bore 11 situated in the pressure connection 10 for axial movement of the ring piston 7. A more extensive description of individual components of the disconnecting device 1 as well as a description of its mode of action are omitted because this does not differ from familiar disconnecting devices.

Figure 2:
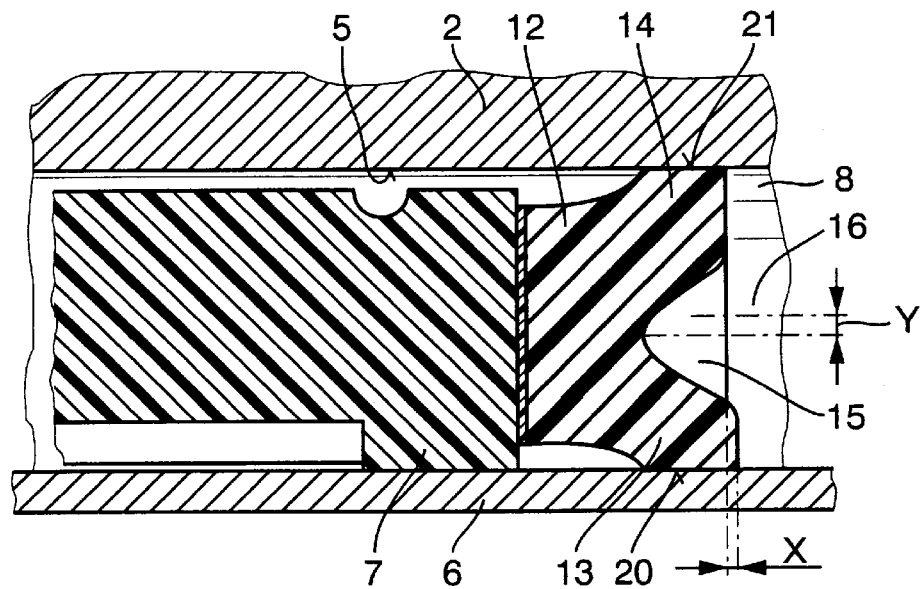
FIG. 2 shows an enlarged scale view of the detail "Z" in accordance with FIG. 1.

In FIG. 2, the detail area "Z" in accordance with FIG. 1 is illustrated in an enlarged scale for clarification of the seal 12 of the invention. The configuration of the seal 12 provides for an asymmetrical arrangement of the sealing lips 13, 14 in connection with which the radially inner sealing lip 13 has a smaller wall thickness than the radially outer sealing lip 14. A further difference between sealing lips 13, 14 consists in their length, that is, the axial length of the radial inner sealing lip 13 projects beyond the length of the radially outer sealing lip 14. This difference is identified as the difference in length "X". The V-shaped outwardly spread apart sealing lips 13, 14 form a recess 15 on the pressure chamber side which has an offset "Y" directed radially from the pressure chamber center 16 toward the guiding sleeve 6. Sliding sealing surfaces 20, 21 are located respectively between the two sealing lips 13, 14 and the associated bearing surface on the longitudinal bore 5 and on the guiding sleeve 6, conditioned by the ring piston 7. A dynamic sealing action of the sealing lips 13, 14 therewith results with which the operating safety of the seal 12 can be improved.

Figure 3:
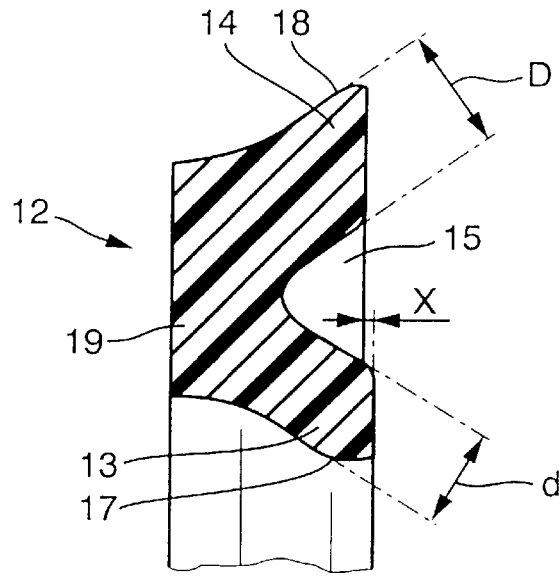
FIG. 3 shows the seal of the invention as a component part in half section.

Further details of the seal of the invention 12 are shown in FIG. 3 in which the seal 12 is illustrated in a half section as an individual component. In the uninstalled state of the seal 12, it is manifest that the wall thickness "d" of the sealing lip 13 or "D" of the sealing lip 14 is constant over the entire length, with the exception of the external rounding on the free end. FIG. 3 moreover makes clear a sealing lip contour running in a straight line parallel to a partition of the recess 15 before this passes over a radius into a back of the seal 19.

Figure 4:
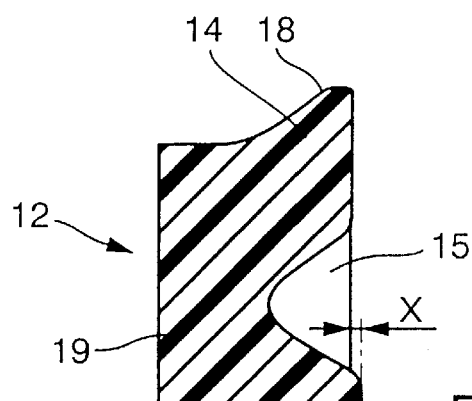
FIG. 4 shows a cross sectional profile of the seal of the invention in an enlarged scale.
Figure 5:
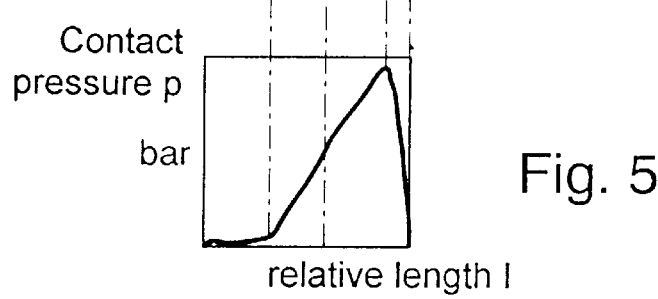
FIG. 5 shows the course of a pressure gradient "dp/dl" for the seal illustrated in FIG. 4.

The cross section profile of the seal 12 is illustrated in FIG. 4, to which the diagram illustrated in FIG. 5 is allocated, in which a pressure gradient curve "dp/dl" of the seal 12 can be discerned. The pressure gradient course describes the contact pressure "p," plotted on the ordinate over the relative length "l," plotted on the abscissa. The curve course shows a steep rise of the pressure gradient from the pressure chamber side until the seal edge 17, 18 is reached. From this pressure profile peak, a continuously falling pressure gradient appears the lowest value of which appears in the area of the half width of the back 19 of the seal.

Figure 6:
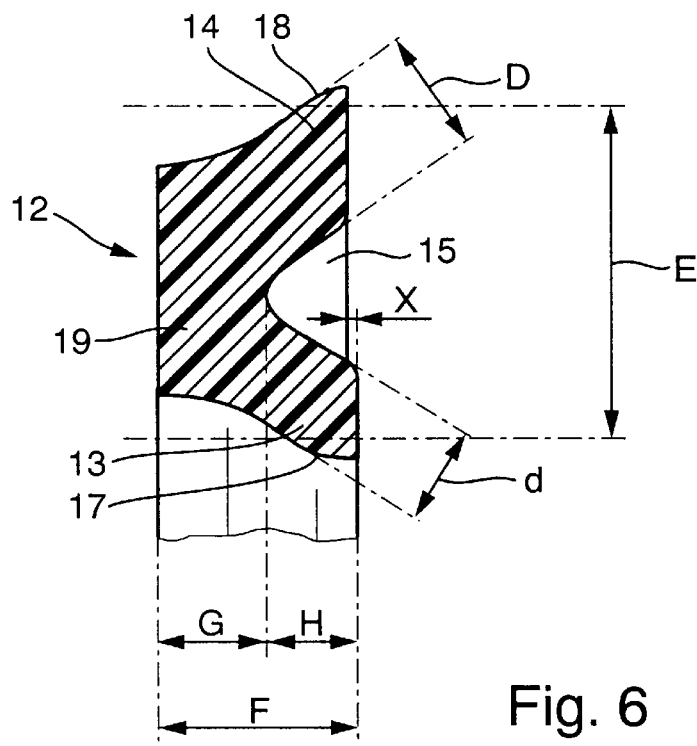
FIG. 6 shows the seal in accordance with FIG. 3 in which individual segments of the seal are identified for determining geometrical proportions.

FIG. 6 serves for determining individual segments of or the geometric proportions of the seal 12 of the invention. The designation "E" here corresponds to the compartment of the seal 12, that is, to a dimension which arises between the contact areas of the sealing lips 13, 14 in an installation position of the seal 12. The overall sealing width, that is the axial dimension of the seal 12, is designated by "F." The length of the inner sealing lip 13 is designated with the letter "H." The letter "G" is provided for indicating the width of the back of the seal 19.

Figure 7:
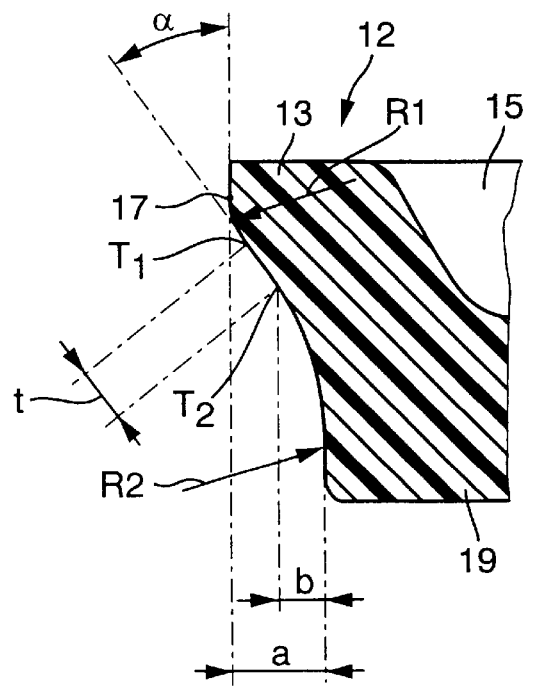
FIG. 7 shows an enlarged seal profile of the invention in a half section to clarify the outer contour path.

FIG. 7 serves to clarify the outer contour path of the seal 12. Accordingly, both sealing lips 13, 14 are first of all provided with a cylinder segment on the pressure chamber side which extends up to a seal edge 17, 18 before the outer contour passes over a radius "$R_1$" to a segment "t" at a tangential point "$T_1$". The segment "t" is directed in a straight line obliquely toward the back of the seal 19 at an angle "$\alpha$" of $\geq 30°$ from the cylindrical outer contour of sealing lips 13, 14. A further radius "$R_2$" follows from a point of tangency "$T_2$" and passes over into the back of the seal 19 on the opposite side. Through a calculation for determination the optimal pressure gradient course, the following values or dimension proportions were determined. For the angle "$\alpha$," a value of $\geq 30°$ was determined. A value of $\geq 0$ was set for the dimension of segment "t". Radius "$R_2$" is clearly constructed larger than radius "$R_1$". For the radial dimension "a" appearing between the outer contour in the area of the back of the seal 19 and the seal edge 17 set in relation to radial dimension "b" which arises between tangential point "$T_2$" and the outer contour in the area of the back of the seal 19, a value of $\geq 0.5$ was determined.

Reference List Number

1 Disconnecting device
2 Pressure housing
3 Gear box input shaft
4 Gear box housing
5 Longitudinal boring
6 Guiding sleeve
7 Ring piston
8 Pressure chamber
9 Release bearing
10 Pressure connection
11 Feed bore
12 Seal
13 Sealing lip
14 Sealing lip
15 Recess
16 Pressure chamber center
17 Seal edge
18 Seal edge
19 Back of the seal
20 Sliding sealing surface
21 Sliding sealing surface
$\alpha$ Angle
a Radial dimension: back of the seal-seal edge
b Radial dimension: back of the seal-$T_2$
d Wall thickness
D Wall thickness
E Compartment
F Seal width
G Breadth of the back of the seal
H Sealing lip length
$R_1$ Radius
$R_2$ Radius
t Segment
$T_1$ Tangential point
$T_2$ Tangential point
X Difference in length
Y Radial offset
Z Detail

What is claimed is:

1. Disconnecting device for a motor vehicle friction clutch including a slave cylinder which can be acted upon by means of a hydraulic fluid and which contains a pressure housing (2) arranged concentrically to a gear box input shaft (3) attached on a gear box housing (4), whereby a guiding sleeve (6) is arranged on the pressure housing (2) radially at a distance to the gear box input shaft (3) and to a longitudinal bore (5) in the pressure housing upon which a ring piston (7) is axially guided and movable, which axially delimits a pressure chamber (8), whereby for sealing the pressure chamber, the ring piston (7) has a seal (12) on a pressure chamber side which is provided with V-shaped, spread apart sealing lips (13, 14), the seal (12) has a cross sectional profile with the sealing lips (13, 14) being arranged asymmetrically in relation to each other which from a seal edge (17, 18) proceeding toward a free end of the sealing lips (13, 14), is configured as a cylindrical segment, the radially outer sealing lip (14) having a greater wall thickness than the radially inner sealing lip (13), and an axial dimension of the inner sealing lip (13), proceeding from a back of the seal (19), exceeds an axial dimension of the outer sealing lip (14), the seal (12) has an outer contour course in the area of the sealing lips (13, 14) which includes a radius "$R_1$" in a transition zone between a cylindrical segment at the free end of the sealing lips (13, 14) and a segment "t" directed obliquely in the direction of the back of the seal (19) proceeding from the seal edge (17, 18) at an angle "$\alpha$" of 24 30°, and a tangential point "$T_1$" of the radius "$R_1$"/ on the segment "t" is provided at a distance from or in the same location as a further tangential point "$T_2$" of a radius "$R_2$," which is provided in a transition zone between the back of the seal (19) and the segment "t."

2. Disconnecting device according to claim 1, characterized by a V-shaped recess (15) between the sealing lips (13, 14) whose center is displaced radially toward the guiding sleeve (6) in relation to a pressure chamber (16).

3. Disconnecting device according to claim 1, characterized in that the sealing lips (13, 14) have a generally constant wall thickness from the free end up to a back of the seal (19).

4. Disconnecting device according to claim 3, characterized in that the wall thickness of the radially outer sealing lip (14) exceeds the wall thickness of the radially inner sealing lip (13) by at least 10%.

5. Disconnecting device according to claim 1, characterized in that a dimension of $\leq 4$ mm is provided as a difference in length "X" for an axial projection of the inner sealing lip (13) in relation to the outer sealing lip (14).

6. Disconnecting device according to claim 1, characterized in that the outer contour course of the sealing lips (13, 14) provides a radial dimension of "b"/"a"$\geq 0.5$, where "b" indicates a distance from the back (19) of the seal up to the tangential point "$T_2$" and the dimension "a" determines the radial distance between the back (19) of the seal and the seal edge (17, 18).

7. Disconnecting device according to claim 1, characterized in that the segment "t" has a dimension of $\geq 0$.

8. Disconnecting device according to claim 1, characterized in that the seal (12) is made of PTFE.

9. Disconnecting device for a motor vehicle friction clutch including a slave cylinder which can be acted upon by means of a hydraulic fluid and which contains a pressure housing (2) arranged concentrically to a gear box input shaft (3) attached on a gear box housing (4), whereby a guiding sleeve (6) is arranged on the pressure housing (2) radially at a distance to the gear box input shaft (3) and to a longitudinal bore (5) in the pressure housing upon which a ring piston (7)

is axially guided and movable, which axially delimits a pressure chamber (8), whereby for sealing the pressure chamber, the ring piston (7) has a seal (12) on a pressure chamber side which is provided with V-shaped, spread apart sealing lips (13, 14), the seal (12) has a cross sectional profile with the sealing lips (13, 14) being arranged asymmetrically in relation to each other which from a seal edge (17, 18) proceeding toward a free end of the sealing lips (13, 14), is configured as a cylindrical segment, the radially outer sealing lip (14) having a greater wall thickness than the radially inner sealing lip (13), and an axial dimension of the inner sealing lip (13), proceeding from a back of the seal (19), exceeds an axial dimension of the outer sealing lip (14), wherein the seal (12) has an outer contour course in the area of the sealing lips (13, 14) which includes a radius "$R_1$" in a transition zone between a cylindrical segment at the free end of the sealing lips (13, 14) and a segment "t" directed obliquely in the direction of the back of the seal (19) proceeding from the seal edge (17, 18) at an angle "α" of ≧30°, and a tangential point "$T_1$" of the radius "$R_1$" on the segment "t" is provided at a distance from or in the same location as a further tangential "$T_2$" of a radius "$R_2$," which is provided in a transition zone between the back of the seal (19) and the segment "t,", wherein the cylindrically configured segment of the sealing lips (13, 14) from the free end up to the seal edge (17, 18) has an axial dimension of ≦2 mm.

10. Disconnecting device according to claim 9, further comprising a V-shaped recess (15) between the sealing lips (13, 14) whose center is displaced radially toward the guiding sleeve (6) in relation to a pressure chamber (16).

11. Disconnecting device according to claim 9, wherein the sealing lips (13, 14) have a generally constant wall thickness from the free end up to the back of the seal (19).

12. Disconnecting device according to claim 11, wherein the wall thickness of the radially outer sealing lip (14) exceeds the wall thickness of the radially inner sealing lip (13) by at least 10%.

13. Disconnecting device according to claim 9, wherein the seal (12) is made of PTFE.

14. Disconnecting device for a motor vehicle friction clutch including a slave cylinder which can be acted upon by means of a hydraulic fluid and which contains a pressure housing (2) arranged concentrically to a gear box input shaft (3) attached on a gear box housing (4), whereby a guiding sleeve (6) is arranged on the pressure housing (2) radially at a distance to the gear box input shaft (3) and to a longitudinal bore (5) in the pressure housing upon which a ring piston (7) is axially guided and movable, which axially delimits a pressure chamber (8), whereby for sealing, the pressure chamber, the ring piston (7) has a seal (12) on a pressure chamber side which is provided with V-shaped, spread apart sealing lips (13, 14), the seal (12) has a cross sectional profile with the sealing lips (13, 14) being arranged asymmetrically in relation to each other which from a seal edge (17, 18) proceeding toward a free end of the sealing lips (13, 14), is configured as a cylindrical segment, the radially outer sealing lip (14) having a greater wall thickness than the radially inner sealing lip (13), and an axial dimension of the inner sealing lip (13), proceeding from a back of the seal (19), exceeds an axial dimension of the outer sealing lip (14), the seal (14) having a sealing profile, the radial inner sealing lip (13) forming the following dimensional proportions.

15. Disconnecting device according to claim 14, further comprising a V-shaped recess (15) between the sealing lips (13, 14) whose center is displaced radially toward the guiding sleeve (6) in relation to a pressure chamber (16).

16. Disconnecting device according to claim 14, wherein the sealing lips (13, 14) have a generally constant wall thickness from the free end up to the back of the seal (19).

17. Disconnecting device according to claim 16, wherein the wall thickness of the radially outer sealing lip (14) exceeds the wall thickness of the radially inner sealing lip (13) by at least 10%.

18. Disconnecting device according to claim 16, wherein the seal (12) is made of PTFE.

* * * * *